H. Stephens,
Making Colors,
No. 3,
Reissued Apr. 21. 1838
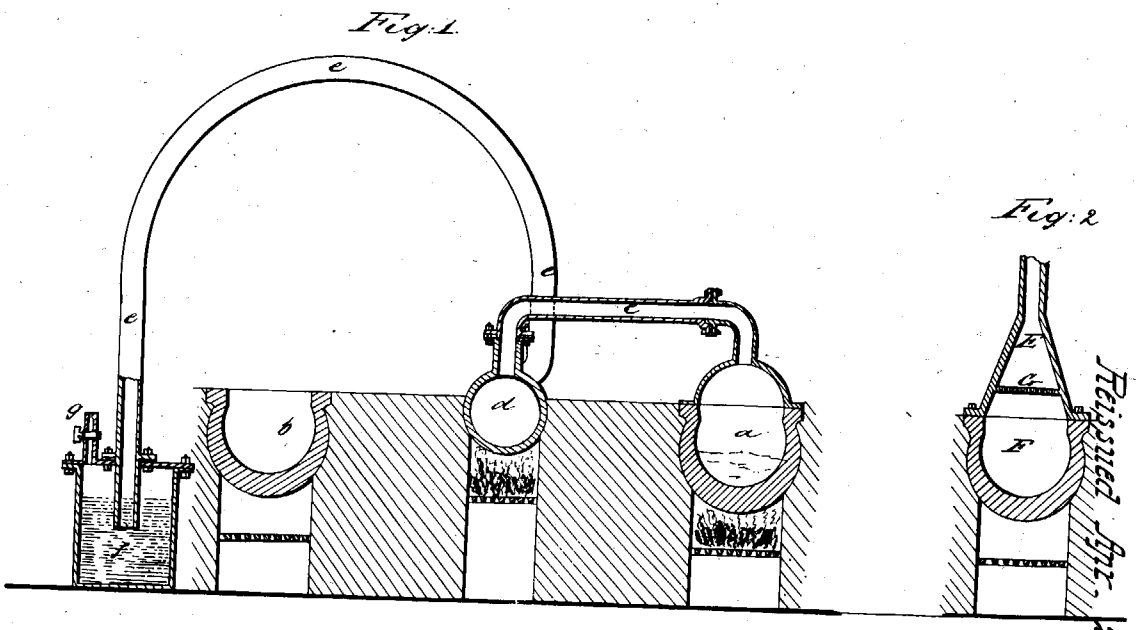
Witnesses.
Wales Bary
W Moffatt
Inventor.
Henry Stephens

UNITED STATES PATENT OFFICE.

HENRY STEPHENS, OF ST. MARYLEBONE, ENGLAND.

IMPROVED MANUFACTURE OF COLORING-MATTER.

Specification forming part of Letters Patent No. 441, dated October 28, 1837; Reissue No. 3, dated April 21, 1838.

*To all whom it may concern:*

Be it known that I, HENRY STEPHENS, a subject of the Queen of Great Britain, and now residing in Charlotte Street, in the parish of Saint Marylebone and county of Middlesex, in the said Kingdom, have invented or discovered a new and useful invention of certain improvements in manufacturing coloring-matter and rendering certain color or colors more applicable to dyeing, staining, and writing; and I do hereby declare that the following is a full and exact description thereof.

My improvements in manufacturing coloring-matter, and rendering certain color or colors more applicable to dyeing, staining, and writing, consist, in the first place, of improvements in making or manufacturing the ferro-prussiates, (that is, prussiates of potash and soda,) and, secondly, in rendering Prussian blue soluble, and thereby more applicable than heretofore to the purposes of dyeing, staining, coloring, and writing, which improvements I am now about to describe under different heads or sections—that is to say:

My first improvement consists in converting certain gaseous products arising from the present mode of making prussiate of potash or soda from animal matter (which are now commonly allowed to escape into the atmosphere) to the purpose of making prussiate of potash or soda, so that an increased quantity of prussiate of potash or soda may be obtained from a given quantity of animal matter.

For the better explanation of this part of my invention, I refer to the annexed drawings, in which—

Figure 1 represents an apparatus for effecting the process of converting the gas evolved into prussiate. *a* is an iron pot, vessel, or retort charged with alkali and animal or other matter containing azote, or yielding ammonia, which vessel is to be heated to a low red heat. This pot or vessel has a movable cover, which is to be luted on when under operation, but may be removed and placed upon another pot, *b*, by disconnecting the joint in the pipe *c*, the joint allowing the head of the pot *a* to be carried round with the connecting-pipe *c*. The pipe *c* is for conducting the gaseous products arising from the decomposition of the said animal matter in the pots *a* or *b* into an iron cylindrical or other conveniently-shaped vessel, *d*, heated by a furnace, *h*, below. This vessel *d* is to be charged with alkali and to be kept at a full red heat during the operation. *e* is a pipe leading from the cylindrical vessel to a closed vessel, *f*, containing a solution of alkali. This vessel is furnished with a jet-pipe or burner, *g*, which is merely intended as a gage-cock to ascertain the state of the gas within. *i i* are furnaces under the pots *a* and *b*. The gas generated in the retort *a* passes by the connecting-pipe *c* to the cylinder *d*, where, meeting with the alkali in a state of fusion, the effect will be that the gas becomes combined to a certain degree with the alkali, and forms prussiate of potash or soda; but there may be portions of the said gas which do not combine or commix with the alkali, these will pass off by the pipe *e* to the closed vessel *f*, and if any of the gas thus passed off should be capable of combining with the alkaline solution it may do so in the closed vessel *f*, and that portion which does not combine with the alkaline solution is allowed to pass off by the gas-jet pipe *g*. The state of operation may be ascertained by burning the jet-gas from the end of this pipe, for when it ceases to burn freely the connection between the pot *a* and cylinder *d* should be disconnected, and the head and pipe *c* be removed round and luted onto the pot *b*, which is to be previously charged with animal matter and alkali, the distillation of which will proceed as before described. When the gaseous products of several charges have been passed through the cylinder *d* containing the alkali, the cylinder may be opened and the charge (which will now consist of crude prussiate of potash or soda, or "metal," as it is commonly called in the trade) be withdrawn into an iron vessel, and when cold be lixiviated in cold water in the usual manner. The further decomposition of the charge of animal matter in the pot *a* may now be conducted in the ordinary manner of making prussiate in the open vessel by increasing the heat, the contents being agitated, as usual. This process may be repeated alternately in the two pots *a* and *b*, the completion of the decomposition of the charge of one being effected, while that of the other is subjected to the lower heat and the operation of distilling off its vapors and passing it to the retort or vessel *c*. A similar effect—viz., that of taking up the gaseous products, so as to produce an additional quantity of crude prussiate of potash or metal—may be obtained in an open conical chimney having a false bottom or grating or perforated plate, upon which dry potash or soda is placed, so that the gas generated in the pot below may pass through the stratum of alkali in the chimney.

Fig. 2 is a sectional elevation representing this application of my improvement. E is the chimney or open cone usually placed on the top of an ordinary pot, F, for making prussiate of potash, in order to convey the flame upward. G is a grating or perforated plate placed at the base of the cone E. Upon this grating or perforated plate G a stratum of dry potash or soda is laid, and as the gas passes upward through this stratum a portion of it will become combined with the alkali. The chimney, with the stratum of alkali, may be removed when the flame begins to burn weak, and it may be set aside and applied to future charges, or put into the pot and worked off with the charge in the usual manner of making prussiate of potash or soda.

My second improvement—viz., the mode, method, or process of treating or operating upon Prussian blue so as to render it more perfectly soluble or more readily disposed to be acted upon by the subsequent process of solution than when manufactured in the usual way, and in order that the same may be more applicable to the purposes of dyeing, staining, coloring, and writing—I effect in the following manner: I take the Prussian blue, whether produced from a combination of prussiate of potash and salts of iron or the Prussian blue of commerce as commonly manufactured, and I put this into an earthen vessel, and pour over it a quantity of strongly-concentrated acid, sufficient to cover the Prussian blue. Muriatic acid, sulphuric acid, or any other acid which has a sufficient action upon iron will do; but I prefer the muriatic acid. If sulphuric acid is used, it should be diluted a little—that is, with a quantity of water equal to about its bulk at the time when the mass turns white after the Prussian blue is put in. The Prussian blue is to be allowed to remain in the acid from twenty-four to forty-eight hours, or longer. I then dilute this mixture with a large quantity of water, stirring it up at the time, for the purpose of washing from it the salts of iron. When in this state of dilution, I suffer it to stand until the color has subsided, when the supernatant liquor is to be drawn off with a siphon and more water added to it; and I continue the repetition of this process until I judge that the acid with the iron has been completely washed away, and this is known by testing it with prussiate of potash, which will show if it yields any blue precipitate; if not, it is sufficiently washed. I then place it upon a filter and suffer it to remain until the liquid has all drained away. The Prussian blue thus prepared is reduced to a state, as I conceive, containing less iron than the Prussian blue of commerce, in which state it is more readily acted upon and rendered soluble than in any other condition. This Prussian blue may be then placed in evaporating-dishes and gently dried. To form the Prussian blue so operated upon into a solution I add to it oxalic acid, and mix them carefully together, after which I add cold water, (cold distilled water is best,) a little at a time, making it into a dense or dilute solution, according to the color required. The quantity of oxalic acid may vary according to the quantity of water used. It will be found that the Prussian blue that has undergone the process of digestion as described requires but a small quantity of oxalic acid to dissolve it. About one part of oxalic acid will dissolve six parts of Prussian blue, (the weight taken before digesting in the acid.) This will answer for a concentrated solution; but for a dilute solution more acid will be required. Prussian blue that has not undergone digestion in acid in the way above pointed out will require a much larger proportion of oxalic acid, from twice to three times its weight, and even then it will be greatly liable to precipitation after standing; but when treated in the way described it is not liable to precipitate, but remains a permanent solution.

The chief obstacle to the general employment of the beautiful color obtained by means of the ferro-prussiates to the purposes of dyeing in the silk, cotton, linen, or woolen manufactures, and also to the purposes of staining and writing, has been its hitherto supposed insoluble nature; but by means of oxalic acid (whether obtained by the usual process of mixing or distilling saccharine matter in combination with nitric acid or from vegetable or other substances containing oxalic acid or from combinations of oxalates, whether metallic, earthy, or alkaline) I obtain the above perfect solution of the Prussian blue, which is applicable to dyeing, coloring, or staining in the various manufactures of woolens, silks, linen, cotton, paper, and such other substances as are required to be dyed or stained, and which solution is also available to the purposes of writing or forming a writing fluid or ink to be used with steel, quill, or other pens.

In conclusion, I desire to be understood that I do not claim any of the apparatus or machinery described, nor the calcination of animal matters in close vessels; but I do claim—

1. The method of obtaining a product of prussiate of potash or soda from the gases evolved from the distillation of animal matters or any other matters that yield azote and carbureted hydrogen—such, for instance, as coal—by means of passing those gases direct into a mass of alkali in a state of ignition and into a solution of alkali contained in separate vessels, either closely or distantly connected with the distillatory apparatus.

2. I do not claim the use of acids for the purpose of brightening or improving the color of Prussian blue in the ordinary manner, but I do claim the use of strong acids for the purpose of digesting dry Prussian blue of commerce in order to render it more easily soluble in the oxalic acid than it would be without such digestion.

3. The use of oxalic acid, however obtained, as a solvent for Prussian blue generally, but more especially as a final process for making a perfect solution of the Prussian blue which has been prepared and digested in the manner above described.

In witness whereof I, the said HENRY STEPHENS, have hereunto set my hand and seal this 28th day of October, in the year of our Lord 1837.

HENRY STEPHENS. [L. S.]

Witnesses:
MILES BENY,
*Office for Patents, 66 Chancery Lane.*
J. W. MOFFATT,
*Clerk to the above.*